United States Patent
Kaufman

(10) Patent No.: US 9,628,514 B2
(45) Date of Patent: Apr. 18, 2017

(54) DEVICE ASSOCIATION USING AN AUDIO SIGNAL

(75) Inventor: Matthew Kaufman, Bonny Doon, CA (US)

(73) Assignee: Skype, Dublin (IE)

( * ) Notice: Subject to any disclaimer, the term of this patent is extended or adjusted under 35 U.S.C. 154(b) by 89 days.

(21) Appl. No.: 13/293,245

(22) Filed: Nov. 10, 2011

(65) Prior Publication Data

US 2013/0122810 A1    May 16, 2013

(51) Int. Cl.
| | |
|---|---|
| *H04B 7/00* | (2006.01) |
| *H04L 29/06* | (2006.01) |
| *H04W 4/20* | (2009.01) |
| *H04L 29/08* | (2006.01) |
| *H04W 12/06* | (2009.01) |

(52) U.S. Cl.
CPC ............ *H04L 63/18* (2013.01); *H04L 67/14* (2013.01); *H04W 4/206* (2013.01); *H04W 12/06* (2013.01)

(58) Field of Classification Search
CPC .......... H04B 7/00; H04W 4/02; H04W 12/06; H04W 4/00; H04W 4/206; H04L 63/18; H04L 67/14
USPC ............................ 455/41.1, 41.2, 41.3, 435.1
See application file for complete search history.

(56) References Cited

U.S. PATENT DOCUMENTS

| | | | | |
|---|---|---|---|---|
| 7,209,947 B1 * | 4/2007 | Lee | ....................... | H04M 3/563 370/261 |
| 7,254,708 B2 * | 8/2007 | Silvester | ................. | H04L 63/08 713/168 |
| 7,729,489 B2 | 6/2010 | Lee et al. | | |
| 8,224,354 B2 | 7/2012 | De Vries et al. | | |
| 9,288,229 B2 * | 3/2016 | Kaufman | ................ | H04L 63/18 |
| 9,450,930 B2 | 9/2016 | Foulds et al. | | |
| 2003/0095521 A1 | 5/2003 | Haller et al. | | |
| 2004/0253923 A1 | 12/2004 | Braley et al. | | |
| 2005/0159132 A1 * | 7/2005 | Wright | .................... | H04L 12/58 455/404.1 |
| 2006/0046719 A1 * | 3/2006 | Holtschneider | ......... | H04W 4/02 455/434 |

(Continued)

FOREIGN PATENT DOCUMENTS

| | | |
|---|---|---|
| CN | 1638383 | 7/2005 |
| CN | 101350723 | 1/2009 |

(Continued)

OTHER PUBLICATIONS

Goodrich, et al., "Loud and Clear—Human-Verifiable Authentication Based on Audio", *Proceedings of the 26th IEEE International Conference on Distributed Computing Systems*, Available at <https://vmw.cs.duke.edu/~msirivia/publications/icdcs.pdf>,(Jul. 4, 2006),15 pages.

(Continued)

*Primary Examiner* — Md Talukder

(57) ABSTRACT

A method of associating a first device with a second device is disclosed. The first device through its speaker broadcasts a request for association using an audio signal. The broadcasted audio signal is received by the second device through its microphone. The first and second devices then cooperatively verifies a security code and upon a successful verification of the security code, the first and the second devices are enabled to communicate with each other.

20 Claims, 3 Drawing Sheets

(56) References Cited

U.S. PATENT DOCUMENTS

| | | | |
|---|---|---|---|
| 2006/0143455 A1* | 6/2006 | Gitzinger | H04L 63/04 713/170 |
| 2006/0282649 A1* | 12/2006 | Malamud | H04L 63/0861 712/26 |
| 2007/0094490 A1 | 4/2007 | Lohr | |
| 2007/0173212 A1* | 7/2007 | Mergler | G08C 19/28 455/92 |
| 2007/0238505 A1* | 10/2007 | Okada | G07F 17/32 463/16 |
| 2008/0049704 A1 | 2/2008 | Witteman et al. | |
| 2008/0244721 A1 | 10/2008 | Barrus et al. | |
| 2009/0199279 A1 | 8/2009 | Lange et al. | |
| 2009/0240814 A1* | 9/2009 | Brubacher | H04W 12/04 709/227 |
| 2009/0247152 A1* | 10/2009 | Manne | H04M 11/066 455/426.2 |
| 2009/0287922 A1 | 11/2009 | Herwono et al. | |
| 2010/0043056 A1 | 2/2010 | Ganapathy | |
| 2010/0053169 A1* | 3/2010 | Cook | G06F 3/16 345/440.1 |
| 2010/0115591 A1* | 5/2010 | Kane-Esrig | G06F 21/36 726/5 |
| 2010/0197322 A1 | 8/2010 | Preston et al. | |
| 2010/0227549 A1* | 9/2010 | Kozlay | H04L 9/0662 455/26.1 |
| 2010/0262696 A1 | 10/2010 | Oshiba | |
| 2010/0278345 A1 | 11/2010 | Alsina et al. | |
| 2011/0047607 A1 | 2/2011 | Chen et al. | |
| 2011/0072263 A1 | 3/2011 | Bishop | |
| 2011/0086593 A1* | 4/2011 | Hardacker | H04M 1/7253 455/41.3 |
| 2011/0092155 A1 | 4/2011 | Piemonte et al. | |
| 2011/0093266 A1* | 4/2011 | Tham | G10L 17/04 704/246 |
| 2011/0096174 A1* | 4/2011 | King | G06F 21/31 348/207.1 |
| 2011/0179182 A1 | 7/2011 | Vadia Ravnas | |
| 2011/0183614 A1 | 7/2011 | Tamura | |
| 2011/0208659 A1 | 8/2011 | Easterly et al. | |
| 2011/0219105 A1 | 9/2011 | Kryze et al. | |
| 2011/0281523 A1 | 11/2011 | Oshiba | |
| 2011/0295502 A1 | 12/2011 | Faenger | |
| 2011/0296506 A1 | 12/2011 | Caspi | |
| 2012/0011575 A1 | 1/2012 | Cheswick et al. | |
| 2012/0017081 A1* | 1/2012 | Courtney | G06K 7/10722 713/156 |
| 2012/0044057 A1* | 2/2012 | Kang | H04L 63/10 340/10.4 |
| 2012/0045994 A1* | 2/2012 | Koh | H04L 63/0492 455/41.3 |
| 2012/0054046 A1 | 3/2012 | Albisu | |
| 2012/0131186 A1 | 5/2012 | Klos et al. | |
| 2012/0140925 A1 | 6/2012 | Bekiares et al. | |
| 2012/0158581 A1 | 6/2012 | Cooley et al. | |
| 2012/0158898 A1 | 6/2012 | van Deventer et al. | |
| 2012/0184372 A1* | 7/2012 | Laarakkers | H04M 1/7253 463/40 |
| 2012/0188147 A1 | 7/2012 | Hosein et al. | |
| 2012/0189140 A1* | 7/2012 | Hughes | H04M 3/56 381/123 |
| 2012/0198531 A1 | 8/2012 | Ort et al. | |
| 2012/0214416 A1* | 8/2012 | Kent | H04L 63/18 455/41.2 |
| 2012/0278727 A1 | 11/2012 | Ananthakrishnan et al. | |
| 2012/0322376 A1 | 12/2012 | Couse | |
| 2012/0324076 A1* | 12/2012 | Zerr | H04W 4/206 709/223 |
| 2013/0031275 A1 | 1/2013 | Hanes | |
| 2013/0036461 A1* | 2/2013 | Lowry | G06F 21/36 726/19 |
| 2013/0088649 A1* | 4/2013 | Yum | H04N 21/4108 348/734 |
| 2013/0110723 A1* | 5/2013 | Huang | H04W 4/008 705/44 |
| 2013/0115880 A1 | 5/2013 | Dal Bello et al. | |
| 2013/0122810 A1* | 5/2013 | Kaufman | H04L 67/14 455/41.2 |
| 2013/0124292 A1 | 5/2013 | Juthani | |
| 2013/0125224 A1* | 5/2013 | Kaufman | H04L 63/18 726/7 |
| 2013/0265857 A1* | 10/2013 | Foulds | G08C 23/02 367/199 |
| 2013/0276079 A1* | 10/2013 | Foulds | H04L 63/08 726/7 |
| 2014/0117075 A1* | 5/2014 | Weinblatt | G06Q 20/02 235/375 |
| 2014/0256260 A1* | 9/2014 | Ueda | H04W 76/023 455/41.2 |
| 2014/0305828 A1 | 10/2014 | Salvo | |
| 2015/0131539 A1* | 5/2015 | Tsfaty | H04B 11/00 370/329 |

FOREIGN PATENT DOCUMENTS

| | | |
|---|---|---|
| CN | 101872448 | 10/2010 |
| EP | 1551140 | 7/2005 |
| JP | 2005122651 | 5/2005 |
| WO | WO-0158080 | 8/2001 |
| WO | WO 2011010925 A1 * | 1/2011 |

OTHER PUBLICATIONS

Prasad, et al., "Efficient Device Pairing using Human-Comparable Synchronized Audiovisual Patterns", *Proceedings of the 6th International Conference on Applied Cryptography and Network Security*, Available at <http://vmw.cis.uab.edu/saxena/docs/sr07.pdf>,(Jun. 3, 2008),19 pages.

Soriente, et al., "HAPADEP—Human-Assisted Pure Audio Device Pairing", *Proceedings of the 11th International Conference on Information Security*, Available at <http://sprout.ics.uci.edu/papers/hapadep.pdf>,(Sep. 15, 2008),11 pages.

"International Search Report and Written Opinion", Application No. PCT/US2012/064577, (Feb. 21, 2013), 22 pages.

"Non-Final Office Action", U.S. Appl. No. 13/293,242, (Jun. 3, 2013),12 pages.

"PCT Search Report and Written Opinion", Application No. PCT/US2012/064576, (May 7, 2013),10 pages.

Saxena, Nitesh et al., "Secure Device Pairing Based on a Visual Channel", *IEEE Symposium on Security and Privacy, 2006*, Available at <http://eprint.iacr.org/2006/050.pdf>,(May 2006), pp. 1-17.

"Final Office Action", U.S. Appl. No. 13/293,242, Sep. 20, 2013, 17 pages.

"Non-Final Office Action", U.S. Appl. No. 13/828,343, Mar. 27, 2014, 13 pages.

"Final Office Action", U.S. Appl. No. 13/828,343, Nov. 14, 2014, 14 pages.

"Foreign Office Action", CN Application No. 201210597199.1, Jan. 29, 2015, 14 pages.

"Non-Final Office Action", U.S. Appl. No. 13/293,242, Dec. 4, 2014, 19 pages.

"Non-Final Office Action", U.S. Appl. No. 13/828,717, Nov. 28, 2014, 20 pages.

"Foreign Office Action", CN Application No. 201210585999.1, Jul. 27, 2015, 16 pages.

"Final Office Action", U.S. Appl. No. 13/828,717, May 20, 2015, 20 pages.

"Final Office Action", U.S. Appl. No. 13/293,242, Apr. 17, 2015, 23 pages.

"Notice of Allowance", U.S. Appl. No. 13/828,343, Apr. 6, 2016, 10 pages.

"Notice of Allowance", U.S. Appl. No. 13/293,242, Dec. 2, 2015, 11 pages.

"Foreign Office Action", CN Application No. 201210597199.1, Oct. 19, 2015, 13 Pages.

(56) References Cited

OTHER PUBLICATIONS

"Notice of Allowance", U.S. Appl. No. 13/293,242, Nov. 12, 2015, 13 pages.
"Non-Final Office Action", U.S. Appl. No. 13/828,343, Dec. 7, 2015, 14 pages.
"Non-Final Office Action", U.S. Appl. No. 13/828,717, Dec. 17, 2015, 25 pages.
"Advisory Action", U.S. Appl. No. 13/828,717, Jul. 27, 2016, 3 pages.
"Final Office Action", U.S. Appl. No. 13/828,717, Jun. 13, 2016, 25 pages.
"Foreign Office Action", CN Application No. 201210585999.1, May 6, 2016, 6 pages.
"Foreign Office Action", CN Application No. 201210597199.1, May 6, 2016, 6 pages.
"Non-Final Office Action", U.S. Appl. No. 13/828,717, Aug. 25, 2016, 26 pages.
"Final Office Action", U.S. Appl. No. 13/828,717, Feb. 7, 2017, 25 pages.

* cited by examiner

DEVICE ASSOCIATION USING AN AUDIO SIGNAL

BACKGROUND OF THE INVENTION

Field of the Invention

Embodiments of the present invention relate generally to associating two or more devices.

Description of the Related Art

Typically, electronic devices are paired using the Bluetooth™ technology. The term "pairing" means that two devices exchange some data to agree to work together to provide a predefined function. For example, a Bluetooth™ enabled mobile phone may be paired with a Bluetooth™ headset and upon a successful pairing, the headset provides speakers and microphone to the mobile phone.

There are many issues with the above stated method of pairing or associating two or more devices. First, a special hardware is needed at both ends to effect such pairing. Second, such pairing can only be used for prewired specific functions based on configured profiles. Also, the Bluetooth™ signals have wider range, hence, without a proper security, unintended pairing may occur. Another issue with the Bluetooth pairing is that the paired devices must stay within a physical proximity to each other after the pairing. Moreover, having extra hardware in devices can put more stress on device batteries.

Using digital codes in radio transmissions have been used in the past. For example, the National Weather Service, in the past, has used digital codes at the beginning and end of every message concerning life- or property-threatening weather conditions targeting a specific area. The inclusion of these digital codes produces a distinct sound which is easily recognized by most people as an emergency alert sounds.

Motorola two way radios also use transmission of data between two devices using audio frequency shift keying (AFSK). These radios have an option allowing the radio to filter out data bursts from the receive audio. Instead of hearing the AFSK data, the user hears a short chirp from the radio speaker each time a data burst occurs.

Hosei Matsuoka, Yusuke Nakashima, Takeshi Yoshimura, and Toshiro Kawahara. 2008. Acoustic OFDM: embedding high bit-rate data in audio. In Proceedings of the 14th international conference on Advances in multimedia modeling (MMM'08), Shin'ichi Satoh, Frank Nack, and Minoru Etoh (Eds.). Springer-Verlag, Berlin, Heidelberg, 498-507 ("Acoustic OFDM") discloses a method of aerial acoustic communication in which data is modulated using OFDM (Orthogonal Frequency Division Multiplexing) and embedded in regular audio material without significantly degrading the quality of the original sound. It can provide data transmission of several hundred bps, which is much higher than is possible with other audio data hiding techniques. The proposed method replaces the high frequency band of the audio signal with OFDM carriers, each of which is power-controlled according to the spectrum envelope of the original audio signal. The implemented system enables the transmission of short text messages from loudspeakers to mobile handheld devices at a distance of around 3 m.

The above usages of the voice signals for communication includes sending the encoded signals over the audible part of a radio transmission and detecting these encoded signals at a receiver.

SUMMARY OF THE INVENTION

In one embodiment, a method of associating a first device with a second device is disclosed. The first device through its speaker broadcasts a request for association using an audio signal. The broadcasted audio signal is received by the second device through its microphone. The first and second devices then cooperatively verifies a security code and upon a successful verification of the security code, the first and the second devices are enabled to communicate with each other.

In another embodiment, a computer readable storage medium containing programming instructions for associating a first device and a second device, the programming instructions includes programming instructions for receiving, via a microphone, a request for association sent using an audio signal from another device. The request includes an audio signal that is outputted from a speaker of the another device. Programming instructions for verifying a security code and programming instructions for enabling the first device and the second device to communicate with each other are also included.

In yet another embodiment, a system, comprises a first device and a second device. The first device includes a speaker and the second device includes a microphone. The system further includes a modulator incorporated in the first device. The modulator is coupled to the speaker, wherein the modulator being configured to generate an audio signal; and a demodulator incorporate in the second device. The demodulator is coupled to the microphone. The demodulator being configured to receive the audio signal. The first device is configured to include data in the audio signal. The data is encoded using a frequency shift keying mechanism and the demodulator is configured to retrieved the data from the audio signal, wherein the data includes a request for association.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
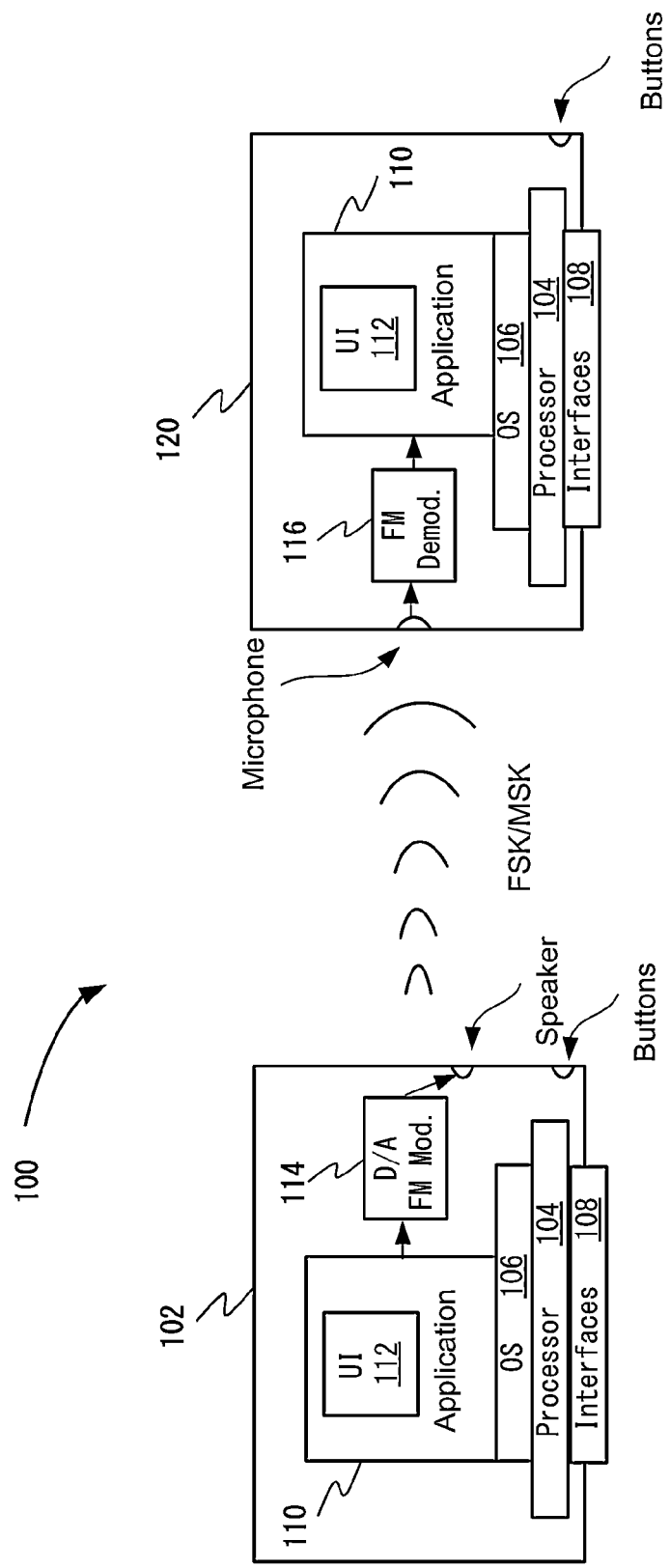
FIG. 1 illustrates a logical diagram of two devices, according to one embodiment of the present invention.

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Reference throughout this disclosure to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Frequency-shift keying (FSK) is a method of encoding digital signals and transmitting the encoded signals as analog signals. The two binary states (i.e., logic 0 and logic 1) are represented by analog waveforms for different frequencies. FSK is often used to transmit low-speed binary data over wireline and wireless links.

Minimum shift keying (MSK) is an efficient form of FSK. In MSK, the difference between the higher and lower frequency is identical to half of the bit rate. Consequently, the waveforms used to represent a 0 and a 1 bit differ by exactly half a carrier period.

Audio FSK is a modulation technique by which digital data is represented by changes in the frequency and an audio tone, yielding an encoded signal suitable for transmission via radio. Normally, the transmitted audio alternates between two tones, one represents a binary one and the other represents a binary zero. There are some other types of special FSK techniques based on the basic FSK principles. The Dual-tone multi-frequency signaling (DTMF) modulation techniques may also be used instead of or in conjunction with the FSK techniques. DTMF is typically used for telecommunication signaling over analog telephone lines in the voice-frequency band between telephone handsets and other communications devices and the switching center.

There are many other modulation techniques available to encode a digital signal in a voice signal. A person skilled in the art would realize that the embodiments described herein can be implemented using any other modulation technique so long as the modulation technique provides encoding coded data in audio signals.

Typically, the process of pairing of two devices using the Bluetooth protocol initiates with a discovery process, which involves one device broadcasting the device identity using a low powered signal transmission. The other device then contacts the first device using the broadcasted information and the devices typically synchronize frequency and clocks and a communication channel is established between the two devices. Subsequently, typically upon entering a security key for the first device in the second device, the pairing is confirmed. The Bluetooth standard defines a certain number of application profiles in order to define which kinds of services are offered by a Bluetooth device. Even though one device can support multiple applications, these applications must be prewired and preconfigured in the device. For example, a Bluetooth™ wireless headset may only act as a headset because the device is prewired with a particular type of Bluetooth profile.

FIG. 1 illustrates a logical view of a system 100 including two devices 102, 120. In one example, the device 120 includes a microphone and the device 102 includes a speaker. The device 102 and the device 120 may also include a speaker and a microphone, respectively. It may be noted that a speaker and a microphone are staple components of a typical mobile communication or computing device. The device 102 includes an application 110 that may be embedded in hardware or may be a software application that runs within an operating system (OS) 106 and is executable by a processor 104 of the device 102. Other well-known components (e.g. memory, etc.) of the two devices have been omitted from FIG. 1 for the sake of clarity.

The device 120 also includes an application. The application in the device 120 may be a copy of the application 110 of the device 102. In another embodiment, the application in the device 120 may be a different application. In one embodiment, the application in the device 120 may be any application so long as the application in the device 120 complies with the data transport protocol of the application 110 in the device 102. The data transport protocol may be any communication protocol based on standard data transmission protocols such as TCP, UDP, etc. This data transport protocol is used by the device 102 to communicate data with the device 120. The device 102 and the device 120 may include an interface layer 108, for example to connect to a network such as the Internet.

In the device 102, the application 110 is coupled to a digital-to-analog (D/A) converter and a FM modulator 114. It may be noted that the D/A converter and/or FM modulator may be implemented in hardware or these modules may also be a part of the application 110. Alternatively, the D/A converter and/or FM modulator may be implemented as software drivers and services running in the OS 106. The D/A converter converts the binary data that the application 110 wants to transmit into analog signals. The FM modulator encodes the data to produce a FSK signal. The FSK signal is then outputted to the speaker of the device 102. Note that other techniques, which are well known to a person skilled in the art, may be used to convert the binary data produced by the application 110 to an FSK signal.

In the device 120, the application 110 (which may or may not be the same as the application 110 of the device 102) is coupled to a FM demodulator 116, which in turn is coupled to the microphone of the device 120. It should be noted that the device 120 may also include a D/A converter and/or a FM modulator and likewise the device 102 may include a FM demodulator.

The OS 106 is a general purpose operating system such as Android™, iOS™, Windows™ Mobile, WebOS™, Linux™, Windows™, etc. Although it is not shown, the OS 106 may include necessary drivers for network interface, sound, and other hardware such as FM modulator/demodulator, and other hardware components that are necessary to operate the device 102 and the device 120.

As noted above, a typical mobile device or computing device may not need any extra hardware (such as FM modulator, FM demodulator, D/A converter, etc.) in order to practice the embodiments as described herein because such functionality may be implemented in software itself. For example, if a device wish to associated with another device through the methods described herein, an application (e.g., the application 110) may be installed on the device. Software or hardware implementations of FM modulators, FM demodulator, D/A converter, etc. are well known in the art. Hence, such details are being omitted.

In one embodiment, the FM modulator and demodulator may be tuned to use above audible frequencies. If frequencies above (or below) audible frequencies are used, the choice of frequencies may depends on the speaker and microphone configurations because the device 102 and device 120 may have filtered installed to filter out the out of range frequencies. Further, RF frequencies may not be used because a RF signal may not be able to drive an audio speaker. Audible frequencies (including slightly higher frequencies, e.g., ultrasonic frequencies) may always be used because microphones and speakers are typically configured to work in these audible frequencies. In yet another embodiment, one set of frequencies may be used during the initial association and another set of frequencies frequencies may be used for subsequent data communication between the devices. It may be noted that even though FIG. 1 shows two devices, more than two devices may participate in the process of association of devices. In one embodiment, one device may act as a master device and all other associated devices will act as ancillary or add-on devices.

The application 110 may include a user interface (UI) 112. A user of the device 102 may use the UI 112 to instruct the device 102 to initiate the pairing or association process. In another embodiment, one or more buttons of the device 102 may be programmed to instruct the device 102 either directly or via the application 110 to initiate the association process. In one embodiment, the device 102 initiates the association process by broadcasting the identification of the device 102 using FSK/MSK. Any other type of audio signal may be used so long as the broadcasted signal can contain encoded identification of the device 102 and the broadcasted audio signal may be detected by the speaker of the device 120. In one embodiment, the IP address of the device 102 is used for the identification. In other embodiments, other attributes of the device 102 may be used so long as the device 102 can be found and communicated with using those attributes. Along with the identification, a random code may also be broadcasted by the device 102.

The broadcasted audio signal is received at the speakers of all other devices in the vicinity. The receiving devices may have an "always active" listener module to capture these broadcasted audio signals. Alternatively, the listener module may be turned on or off as and when desired. The listener module (which may be a part of the FM demodulator 116 module of the application 110) may include programming to distinguish broadcast audio signals for device association from other audio signals. For example, the broadcasted signal may include a flag or code to inform the receiving devices that the audio signal contains pertains to device association. In one embodiment, the strength of the audio signals is configured to have a short range. For example, the range may be limited to the dimensions of a typical office conference room.

During the association process, the device 102 may display a security code on the display of the device 102. The security code may be a text string, a numeric or alpha numeric code. In another embodiment, the device 102 may display a graphical representation (e.g., QR code, or bar code) of the security code. In yet another embodiment, the device 102 may display a graphics such a duck, a house, etc. In another embodiment, the security code may be given to the user of the device 120 privately orally or via a text message or an email, away from the public view.

In another embodiment, a user of the device 120 provides a special security code to the user of the device 102. This special security code is associated with the device 120. This security code is then entered into the device 102 and then this security code is transmitted to the device 120 along with the request for association. Upon a successful verification of the security code, the device 120 sends a success signal back to the device 102. The success signal may be sent in the same way as the request for association sent from the device 102.

When the device 120 receives the transmitted audio signal, the device 120's FM demodulator/data extractor extracts the identification of the device 102. In one embodiment, the user of the device 120 enters the security code displayed on the display of the device 102. If the device 102 displays an encoded graphics, the device 120 may use a built-in camera to scan the encoded graphics. If the device 102 displays other types of graphics, such as a duck, the user of the device 120 may enter the name of the object in the displayed graphics. It should be noted that unlike Bluetooth pairing mechanism, the above pairing mechanism described herein does include Bluetooth type discovery mechanism.

After the user of the device 120 enters the security code, in one embodiment, the device 120 encode its own identification in a FSK/MSK signal and broadcasts, along with the security code entered by the user. The device 102 receives the data through the FSK signal and checks the security code. The association process concludes if the security code matches. The two devices may exchange more data to determine what functions need to be distributed between them. In one embodiment, the devices may be configured to skip security mechanism. Alternatively, in another embodiment, the security code may be generated by the device 120 and the device 102 transmits this security code for verification by the device 120. Still further, both devices 102, 120 generate security codes that need to be verified through the above stated mechanism (e.g., the device 102 verifies the security code of the device 120 and vice versa).

In another embodiment, instead of broadcasting the FSK signal, the device 120 send a response message through a network to which the both devices are connected, using the identification of the device 102. Hence, in this embodiment, only the device 102 uses the FSK signal to broadcast its identification. Any subsequent communication between the device 102 and the device 120 takes place using the network (e.g., the Internet).

Figure 2:
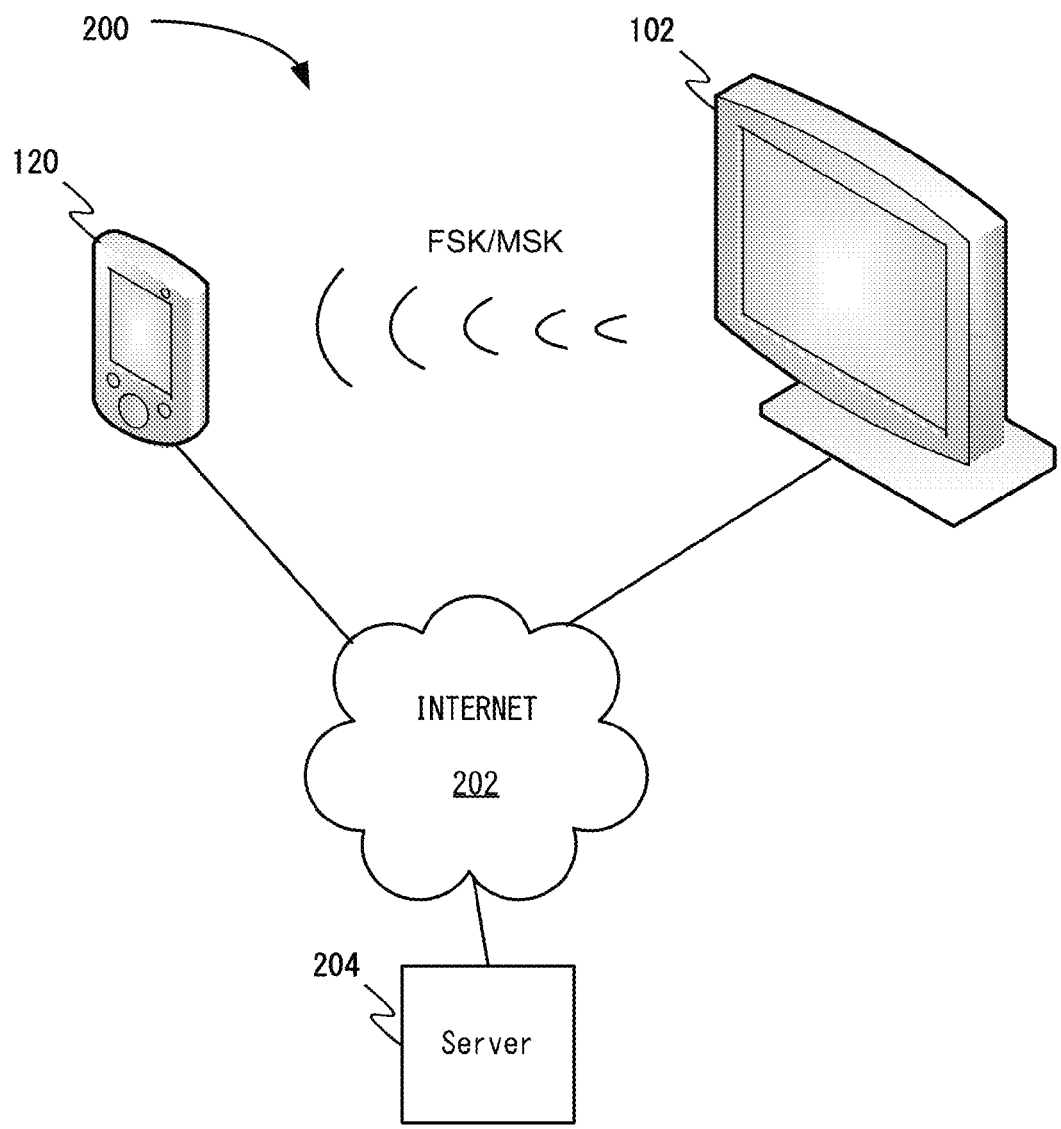
FIG. 2 is a schematic diagram of associating two devices that are connected to a server, according to one embodiment of the present invention.

FIG. 2 describes another aspect of the association process 200. Accordingly, the device 102 broadcasts a FSK signal and the device 120 receives the broadcasted signal. The device 102 and the device 120 are connected to the Internet 202. Subsequently, the device 120 sends, via the Internet 202, a message that includes the identification of the device 120 and the security code entered by the user of the device 120, to the device 102.

In one embodiment, the device 102 and the device 120 include applications that are connected to a server 204. For example, the applications of the device 102 and the device 120 may be messaging clients and the server 204 may be a messaging server through which the messaging clients connect to other messaging clients. Upon conclusion of the initial handshake as described above, the applications in the device 102 and the device 120 may communicate with the server 204 to cooperatively distribute the functionality between the two devices. For example, the device 102 may be in an active communication session with a third device and may wish to transfer the active session to the device 120. Alternatively, the device 102 may want to transfer the camera functions of the active session to the device 120 instead of transferring the entire active session to the device 102. In other words, the application 110 and the server 204 may be configured to provide various options to the devices after they associate with each other, without any need for prewiring the devices for particular usage.

In one embodiment, to reduce noise interference, the encoded data in the broadcasted signal further includes a special flag or code so that the application in the device 120 may distinguish the audio signals for initiating the device association from the device 102.

Figure 3:
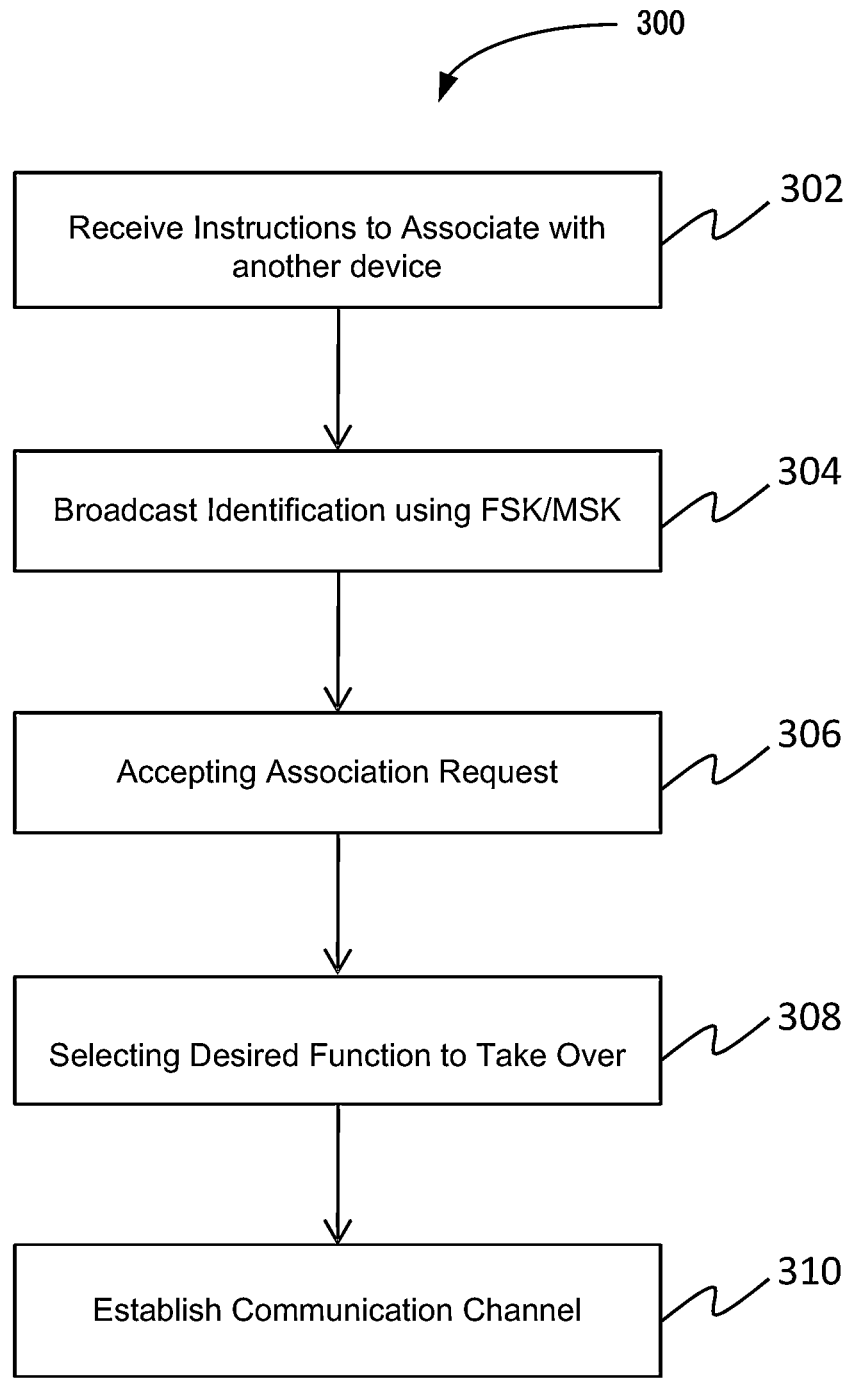
FIG. 3 illustrates an exemplary process of associating two devices, according to one embodiment of the present invention.

FIG. 3 illustrates a method 300 of associating two devices. At step 302, a first device receives instruction from a user to initiate the association process. The instructions may be received via a user interface or a preconfigured button of the first device. At step 304, the first device broadcasts its identification. The identification of the first device may be encoded in an audio signal using techniques such as FSK/CFSK/MSK, etc. The broadcast of the encoded data is performed through the standard speaker of the first device.

At step 306, a second device receives the broadcasted message via the microphone of the second device. The second device then decodes the encoded signal and extracts the identification of the first device. Optionally, the first device also displays a security code or security graphics. If the security code or security graphics is displayed, after extracting the identification of the first device, the second device requests its user to enter the security code in the second device. The second device then contacts the first device either using the identification of the first device or through a broadcast message. The response broadcast message or the message sent to the first device via the network includes the identification of the second device and optionally the security code of the first device.

At step 308, the fist and the second devices negotiate distribution of desired functions between them. A user may also participate in the selection of desired functions for each of the two devices after the device association process. At optional step 310, a communication channel may be established between the two devices.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

I claim:

1. A method comprising:
    transmitting an audio signal through a speaker of a first device, the audio signal configured for detection by a second device and comprising a request for association with the second device;
    after transmitting the audio signal configured for detection by the second device, rendering a first security code on a display of the first device to enable a user of the second device to view the first security code on the display of the first device;
    receiving a response message from the second device, the response message including a second security code, the response message received after the first security code is rendered on the display of the first device;
    comparing the second security code to the first security code and verifying the second security code if the second security code matches the first security code; and
    responsive to verifying the second security code, connecting to the second device.

2. The method of claim 1, wherein the audio signal includes an identification of the first device.

3. The method of claim 2, wherein the identification is encoded in the audio signal using one of a frequency shift keying (FSK) method or a dual-tone multi-frequency signaling (DTMF) method.

4. The method of claim 1, wherein the verification of the second security code enables the first device to communicate with the second device through audio signals using audible frequencies.

5. The method of claim 1, wherein the first device and the second device are connected to a communication network.

6. The method of claim 5, wherein the verification of the second security code enables the first device to communicate with the second device through the communication network.

7. The method of claim 1, wherein the first security code comprises a text string, a numeric code, or an alpha numeric code.

8. The method of claim 1, wherein rendering the first security code comprises rendering a graphical representation of the first security code on the display of the first device.

9. The method of claim 1, wherein the first security code comprises a picture of an object, and wherein the second security code comprises a textual description of the object.

10. A computer readable storage device comprising programming instructions stored thereon that, responsive to execution by a processor of a device, perform operations comprising:
    transmitting an audio signal through a speaker of the device, the audio signal configured for detection by an additional device and comprising a request for association with the additional device;
    after transmitting the audio signal, rendering a first security code on a display of the device to enable a user of the additional device to view the first security code on the display of the device;
    receiving a response message from the additional device, the response message including a second security code, the response message received after the first security code is rendered on the display of the device;
    comparing the second security code to the first security code and verifying the second security code if the second security code matches the first security code; and
    responsive to verifying the second security code, connecting to the additional device.

11. The computer readable storage device of claim 10, wherein the audio signal includes an identification of the device, wherein the identification of the device is encoded in the audio signal using one of a frequency shift keying (FSK) method or a dual-tone multi-frequency signaling (DTMF) method.

12. The computer readable storage device of claim 10, wherein if the security code is verified by the additional device, communication is enabled between the device and the additional device through audio signals using audio frequencies.

13. The computer readable storage device of claim 10, wherein the device and the additional device are connected to a communication network.

14. The computer readable storage device of claim 13, wherein if the security code is verified by the additional device, communication is enabled between the device and the additional device through the communication network.

15. The system of claim 10, wherein the device is further configured to decipher the data to retrieve the request for association when the data is received at the device via the audio signal.

16. The computer readable storage device of claim 10, wherein the first security code comprises a picture of an object, and wherein the second security code comprises a textual description of the object.

17. A computing device comprising:
a display;
one or more speakers;
one or more processors; and
one or more memories having instructions stored thereon that, responsive to execution by the one or more processors, perform operations comprising:
transmitting an audio signal through the one or more speakers, the audio signal configured for detection by an additional computing device and comprising a request for association with the additional computing device;
after transmitting the audio signal, rendering a first security code on the display to enable a user of the additional computing device to view the first security code on the display;
receiving a response message from the additional computing device, the response message including a second security code, the response message received after the first security code is rendered on the display;
comparing the second security code to the first security code and verifying the second security code if the second security code matches the first security code; and
responsive to verifying the second security code, connecting to the additional computing device.

18. The computing device of claim 17, wherein the first security code comprises a text string, a numeric code, or an alpha numeric code.

19. The computing device of claim 17, wherein rendering the first security code comprises rendering a graphical representation of the first security code on the display.

20. The computing device of claim 17, wherein the security code comprises a picture of an object, and wherein the second security code comprises a textual description of the object.

* * * * *